US008553611B2

(12) United States Patent
Miu et al.

(10) Patent No.: US 8,553,611 B2
(45) Date of Patent: Oct. 8, 2013

(54) SYSTEMS AND METHODS FOR MULTI-ACCESS POINT TRANSMISSION OF DATA USING A PLURALITY OF ACCESS POINTS

(75) Inventors: Allen Miu, Cambridge, MA (US); John Apostolopoulos, Palo Alto, CA (US); Wai-tian Tan, Sunnyvale, CA (US); Mitchell Trott, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2157 days.

(21) Appl. No.: 10/769,090

(22) Filed: Jan. 30, 2004

(65) Prior Publication Data

US 2005/0169209 A1   Aug. 4, 2005

(51) Int. Cl.
*H04W 4/00* (2009.01)
*H04W 72/00* (2009.01)
*G08C 15/00* (2006.01)

(52) U.S. Cl.
USPC ........... 370/328; 370/236; 370/331; 455/450; 455/452.1; 455/453

(58) Field of Classification Search
USPC ............. 370/328, 236, 331, 395.21; 455/450, 455/436, 442, 440
See application file for complete search history.

(56) References Cited

U.S. PATENT DOCUMENTS

| | | | |
|---|---|---|---|
| 5,577,022 A | 11/1996 | Padovani et al. | |
| 6,594,245 B1* | 7/2003 | Rimhagen et al. | 370/337 |
| 6,993,342 B2* | 1/2006 | Kuchibhotla et al. | 455/450 |
| 7,194,741 B2* | 3/2007 | Tayyar et al. | 718/102 |
| 2001/0024430 A1* | 9/2001 | Sekine et al. | 370/331 |
| 2002/0085498 A1* | 7/2002 | Nakamichi et al. | 370/236 |
| 2002/0160783 A1 | 10/2002 | Holtzman et al. | |
| 2002/0161884 A1* | 10/2002 | Munger et al. | 709/224 |
| 2003/0009576 A1 | 1/2003 | Apostolopoulos et al. | |
| 2003/0078045 A1* | 4/2003 | Norstrom et al. | 455/436 |
| 2003/0095552 A1* | 5/2003 | Bernhard et al. | 370/395.21 |
| 2004/0043767 A1* | 3/2004 | Tsutsumi et al. | 455/432.1 |

FOREIGN PATENT DOCUMENTS

| | | |
|---|---|---|
| JP | 10032586 | 2/1998 |
| JP | 2001036964 | 2/2001 |
| WO | WO 03/096657 | 11/2003 |

* cited by examiner

Primary Examiner — Christopher M Brandt

(57) ABSTRACT

Methods and systems for multi-access point transmission of data using a plurality of access points are disclosed. Methods include identifying a plurality of access points to be used cooperatively in combination with each other for the transmission of data to a receiver. The transmission of the data to the receiver via the plurality of access points is enabled utilizing at least one multi-access point transmission scheme.

36 Claims, 15 Drawing Sheets

Table 1.

| Scheme | Delay Threshold ($D_{thr}$) | | | | | | | | |
|---|---|---|---|---|---|---|---|---|---|
| | 40ms | | | 80ms | | | ∞ | | |
| | PLR | $PLR_B$ | Bursts | PLR | $PLR_B$ | Bursts | PLR | $PLR_B$ | Bursts |
| AP1 | 16.41 | 11.97 | 956 | 8.32 | 4.98 | 386 | 6.56 | 2.86 | 288 |
| AP2 | 18.20 | 13.29 | 1074 | 9.00 | 5.32 | 415 | 7.00 | 3.01 | 323 |
| Balanced | 17.19 | 5.48 | 545 | 8.58 | 1.45 | 131 | 6.70 | 0.63 | 67 |
| Site Selection | 13.89 | 9.01 | 818 | 6.00 | 2.74 | 243 | 4.58 | 1.35 | 144 |
| Oracle | 3.73 | 2.06 | 184 | 0.92 | 0.59 | 38 | 0.26 | 0.13 | 9 |

FIG. 8

Table 2.

| Scheme | Sequence | | | | | | | |
|---|---|---|---|---|---|---|---|---|
| | Foreman (35.8 dB at 156.2 kb/s) | | Claire (39.6 dB at 39.2 kb/s) | | Mother & Daughter (36.2 dB at 68.6 kb/s) | | Salesman (34.9 dB at 67.6 kb/s) | |
| | $PSNR_{Avg}$ | $N_{thresh}$ | $PSNR_{Avg}$ | $N_{thresh}$ | $PSNR_{Avg}$ | $N_{thresh}$ | $PSNR_{Avg}$ | $N_{thresh}$ |
| AP1 | 24.34 | 71 | 31.61 | 8 | 31.23 | 15 | 30.19 | 16 |
| AP2 | 24.01 | 69 | 31.05 | 9 | 31.12 | 17 | 29.85 | 10 |
| Balanced | 24.40 | 82 | 32.78 | 6 | 31.81 | 9 | 30.76 | 7 |
| Site Selection | 25.77 | 58 | 34.11 | 2 | 32.79 | 4 | 32.03 | 3 |
| Oracle | 31.58 | 7 | 37.11 | 1 | 35.12 | 2 | 33.92 | 2 |

FIG. 9

SYSTEMS AND METHODS FOR MULTI-ACCESS POINT TRANSMISSION OF DATA USING A PLURALITY OF ACCESS POINTS

TECHNICAL FIELD

Embodiments of the present invention pertain to the wireless delivery of content over a network.

BACKGROUND ART

A wireless local area network (LAN) is a network that allows mobile users to access network resources through a wireless radio connection. 802.11b wireless networks are increasingly being adopted as a means of providing low cost wireless infrastructure in business and industry settings. These developments are occurring as 802.11 radios are being integrated as standard components within mobile computing devices such as laptops and PDAs. It should be appreciated that most conventional uses of wireless LANs involve data delivery. These LANs provide simple and low cost wireless connectivity and data delivery. However, their use in low-delay applications such as voice over IP (VoIP) and video over IP (video phones) represents an emerging frontier in wireless network communications.

In contrast to data communications (which are very sensitive to data packet losses but typically not sensitive to delays), voice and video communications can tolerate some losses, but have strict delay requirements. Specifically, if a voice or video packet arrives late, it is rendered useless, which is equivalent to it being lost. Consequently, the quality of the transmissions that involve such effective data packet losses can be severely impacted. Issues such as this must be addressed to provide satisfactory voice and video communications systems on 802.11.

There has been considerable work on 802.11 networking for data delivery, and also some work on low latency communication over 802.11b. Some of this work included the examination of the link-layer behavior for UDP traffic as a function of data packet size and the effect of Bluetooth or microwave oven interferers on 802.11 bandwidth and delay performance. In addition, there have been various approaches suggested for the transmission of video over 802.11.

In one suggested approach, forward error correction (FEC) is used to overcome time-varying wireless losses (for example by adding 50 parity data packets to every 100 data packets) leading to a delay of 100-50 data packets (depending on the loss pattern). This level of data packet delay renders this approach inappropriate for low delay applications. In another approach, error-resilient source coding coupled with path diversity has been examined for multiple description video coding and path diversity over data packet networks, low-latency voice over IP using the distributed infrastructure of a content delivery network (CDN) to achieve path diversity between multiple senders in a CDN and each client, and using path diversity over ad-hoc wireless networks for MD image communication.

FIGS. 1A, 1B and 2 illustrate an aspect of the operation of a conventional hand-off transmission scheme. FIG. 1A shows a series of transmitted data packets $d_1$-$d_{17}$ transmitted using a conventional handoff technique (such as is illustrated in FIG. 1B) during a data transmission period $t_0$-$t_x$ (where $d_1$ is transmitted at time $t_0$ and $d_x$ is transmitted at time $t_x$). Conventional handoff techniques attempt to improve data transmission by effecting a change of route in a data transmission path. Transmission over an identified channel (such as $d_1$-$d_{17}$ over channel AP1 in FIGS. 1A and 1B) is effected until a channel that presents more favorable transmission conditions (such as channel AP2 in FIG. 2 for transmission of packets $d_{18}$-$d_{34}$ during period $t_{x+1}$-$t_n$) is identified. It should be appreciated that handoff techniques feature the effecting of simple one dimensional changes in the dominant route of the transmission path that is used. A drawback of such techniques is that handoffs between access points can be lengthy and can cause interruptions in delay sensitive applications such as VoIP. Another drawback of such techniques is that in many cases the decision rule that is employed to select the handoff path does not yield expected results (e.g., the transmission of a data packet over a path judged to be optimal by a handoff decision rule proves unsatisfactory).

Some cellular systems utilize two access points that each transmit waveforms containing the same data as a means of improving transmission results. These waveforms are transmitted and received simultaneously. The waveforms are combined at the physical layer by the client or hand set. The physical layer for cellular systems is arranged such that only the simultaneous transmission of such waveforms is supported. It should be appreciated that some wireless networks such as 802.11 are not designed to facilitate simultaneous transmissions of this sort. Such transmissions in the 802.11 context could result in transmission failure due to catastrophic data packet collisions.

Conventional wireless transmission schemes such as those discussed above exhibit highly variable delays, substantial data packet losses and significant bandwidth constraints. These transmission schemes can perform satisfactorily when employed in data delivery applications such as web browsing, checking e-mail and performing file down loads. However, because of the delays that they exhibit, such transmission schemes do not perform satisfactorily in voice over IP (VoIP) or video over IP (video phone) applications.

DISCLOSURE OF THE INVENTION

Methods and systems for multi-access point transmission of data using a plurality of access points are disclosed. One method includes identifying a plurality of access points to be used cooperatively in combination with each other for the transmission of data to a receiver. The transmission of the data to the receiver via the plurality of access points is enabled utilizing at least one multi-access point transmission scheme.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 8 shows results in table format for various multi-access point transmission schemes according to one embodiment of the present invention.

FIG. 9 shows results in table format for various multi-access point transmission schemes according to one embodiment of the present invention.

Figure 1A:
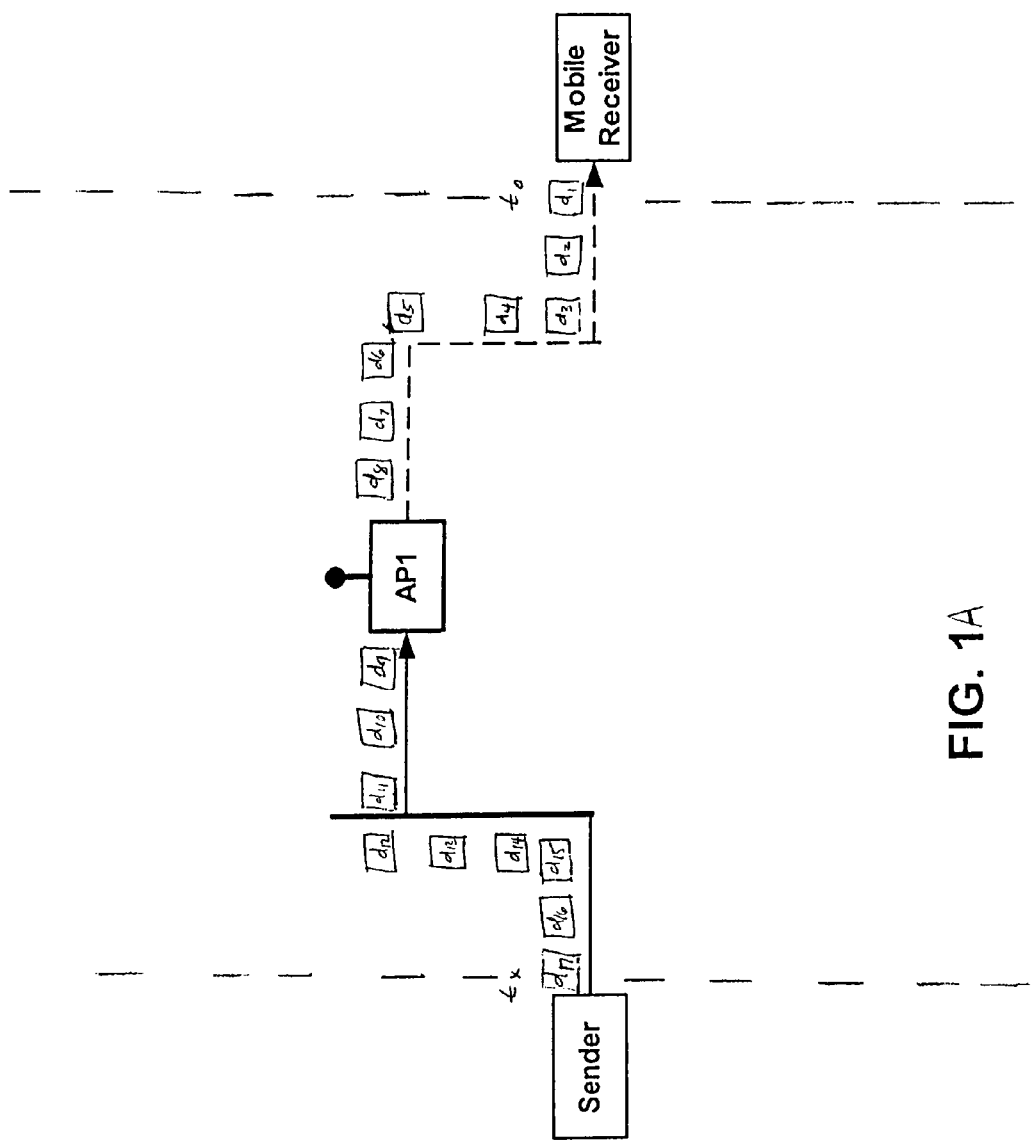
FIG. 1A illustrates an aspect of the operation of a conventional handoff scheme.
Figure 1B:
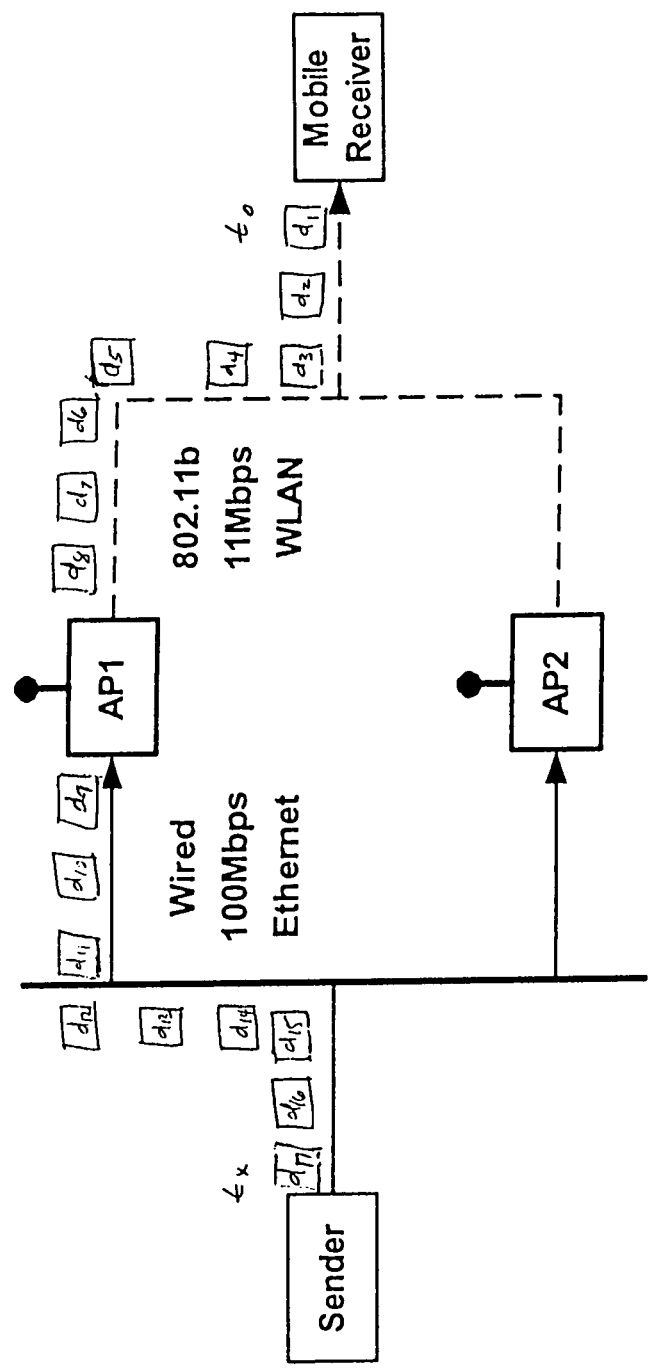
FIG. 1B illustrates an aspect of the operation of a conventional handoff scheme.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview of Nomenclature and Exemplary Data Transmission Infrastructure in Accordance with Embodiments of the Present Invention In the following discussion, embodiments of the present invention will be explicitly described in which a plurality of access points located in a distributed infrastructure of access points are identified and used cooperatively in combination with each other for the transmission of data to a receiver. The transmission of data to the receiver via the identified plurality of access points is thereafter enabled using at least one of a plurality of multi-access point transmission schemes.

For purposes of the following discussion the term "cooperatively in combination with each other" is intended to refer to the action of a plurality of access points as a multi-pronged data transmitting system that remains intact for at least some portion of a data transmission period. Moreover, the term "distributed infrastructure of access points" refers to access points that reside at various geographical locations in a data communications network. Each of the access points in the plurality of access points transmits a respective portion of the data during the aforementioned transmission period.

Additionally, for purposes of the following discussion the term "multi-access point transmission scheme" is intended to refer to a data transmission scheme that features the allocation of data among a plurality of access points that are used cooperatively in combination with each other during a transmission period. In the discussions to follow several multi-access point transmission schemes are described (see discussions made with reference to FIGS. 4A-4D below). Each of the multi-access point transmission schemes described herein feature distinctive transmission patterns. These transmission patterns are illustrated in FIGS. 4A-4D. It should be appreciated that each of the multi-access point transmission schemes are configured as a means to improve various aspects of data transmission performance that are discussed herein. As mentioned above, each of the access points comprising the plurality of access points transmits a respective portion of the data during the transmission period. As will be described herein in detail, multi-access point transmission schemes may be adaptive or non-adaptive. In the adaptive case, feedback is utilized to affect the allocation of data packets among the access points. In the non-adaptive case, the allocation of data packets can be performed without feedback. Also, for purposes of brevity and clarity, many of the following examples and descriptions of the embodiments of the present invention specifically recite the use of data packets. It should be understood, however, that, although such a data format is recited in the following detailed description, the present invention is also well suited to use with various other data formats and with various types of data including, but not limited to, streaming and non-streaming data.

Figure 3:
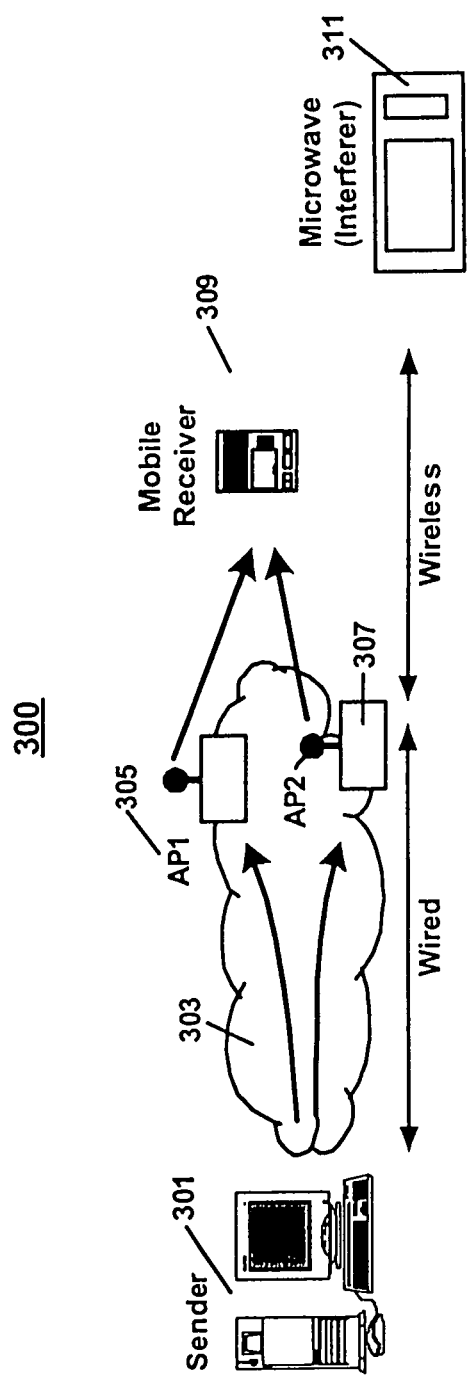
FIG. 3 shows the various components of a wireless network that encompasses a distributed infrastructure of access points according to one embodiment of the present invention.

FIG. 3 shows the various components of a wireless network 300 that encompasses a distributed infrastructure of access points according to one embodiment of the present invention. FIG. 3 shows sender 301, infrastructure 303, first access point (AP1) 305, second access point (AP2) 307, receiver 309 and interference source 311.

Sender 301 transmits data in a data stream to a receiver 309 via a plurality of access points (e.g., access point 305 and access point 307 of FIG. 3). It should be noted that a separate and distinct transmission path is defined through each of the plurality of access points. Respective portions of the data stream that are transmitted to the receiver 309 from sender 301 traverse the separate transmission paths that are controlled by the individual access points. The plurality of access points operate cooperatively in combination with each other in the transmission of the respective portions of the data stream from the sender to the receiver 309. According to one embodiment, the data that is transmitted by the sender 301 may include but is not limited to data generated by a voice over IP or video over IP application.

According to one embodiment, the character of this multi-access point transmission scheme (e.g., a transmission scheme and an allocation of streaming data packets) is determined continuously. According to one embodiment, either conventional coding or multiple description coding can be employed.

Referring again to FIG. 3, first access point 305 and second access point 307 are utilized to transmit data to a common receiver 309. The first and second access points, 305 and 307, respectively, are selected from access points located in a distributed infrastructure of access points such as is discussed above. The selected first and second access points 305 and 307 forward the data packets received from the sender 301 to a receiver 309. It should be appreciated that software, hardware or a combination of both (or components thereof) that can be used to determine the allocation of data packets among the access points can reside either at the end nodes of the network (e.g., sender 301 or receiver 309) or at intermediate network nodes (e.g., access points, switch, etc).

Receiver 309 receives the data that is transmitted to it by sender 301 via first and second access points 305 and 307. The data that is received is typically recombined by the receiver 309 so that it can be utilized by a user. It should be appreciated that receiver 309 can provide information that can be used in the data packet allocation process (discussed below). As previously mentioned, software, hardware or a combination of both (or components thereof) that can be used to determine the allocation of data packets among the various access points can reside at the receiver 309 as well as at other network nodes.

Receiver 309 can be virtually any kind of user device such as, but not limited to, a desktop or laptop computer system, or a video-enabled handheld computer system (e.g., a portable digital assistant) or cell phone. More generally, receiver 309 is used to receive data that is transmitted from sender 301.

Infrastructure 303 can include both wired and wireless portions. As is shown in FIG. 3, a wired portion can be used to transmit data packets from the sender 301 to the access points 305 and 307 and a wireless portion can be used to forward data packets from the access points 305 and 307 to the receiver 309. According to an alternate embodiment other wired/wireless architectures can be employed. According to one embodiment, access points 305 and 307 can be situated on either one or both sides of the infrastructure 303.

Interference sources 311 can impair the transmission of the data that is transmitted from the sender 301 to the receiver 309. Interference sources can include but are not limited to radio signals, cross traffic, and microwave ovens. According to exemplary embodiments, the present invention enhances the quality of a client's communication from, for example, a wireless to a wired space, despite the presence of interference sources 311. That is, the present embodiments utilize the distributed infrastructure of access points surrounding a client to provide sender 301 or receiver 309 diversity which provides improved resistance to interference. A plurality of multi-access point transmission schemes (discussed herein) can be employed to make the fullest use of the available distributed infrastructure of access points.

According to one embodiment, the present invention is generally applicable to wireless networks. Moreover, it should be appreciated that Hyper LAN or other schemes for implementing wireless LAN in a business environment can be employed.

Figure 4A:
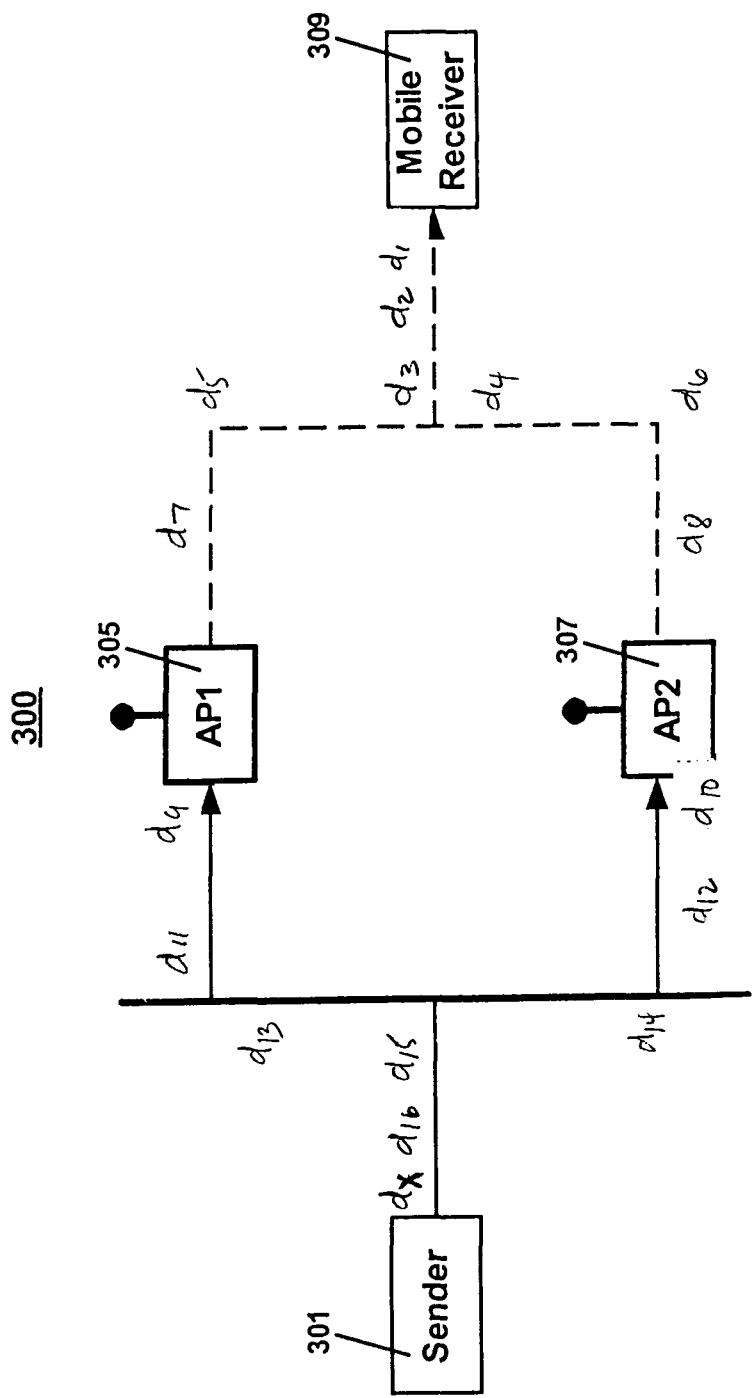
FIG. 4A shows a balanced split stream multi-access point transmission scheme according to one embodiment of the present invention.
Figure 6:
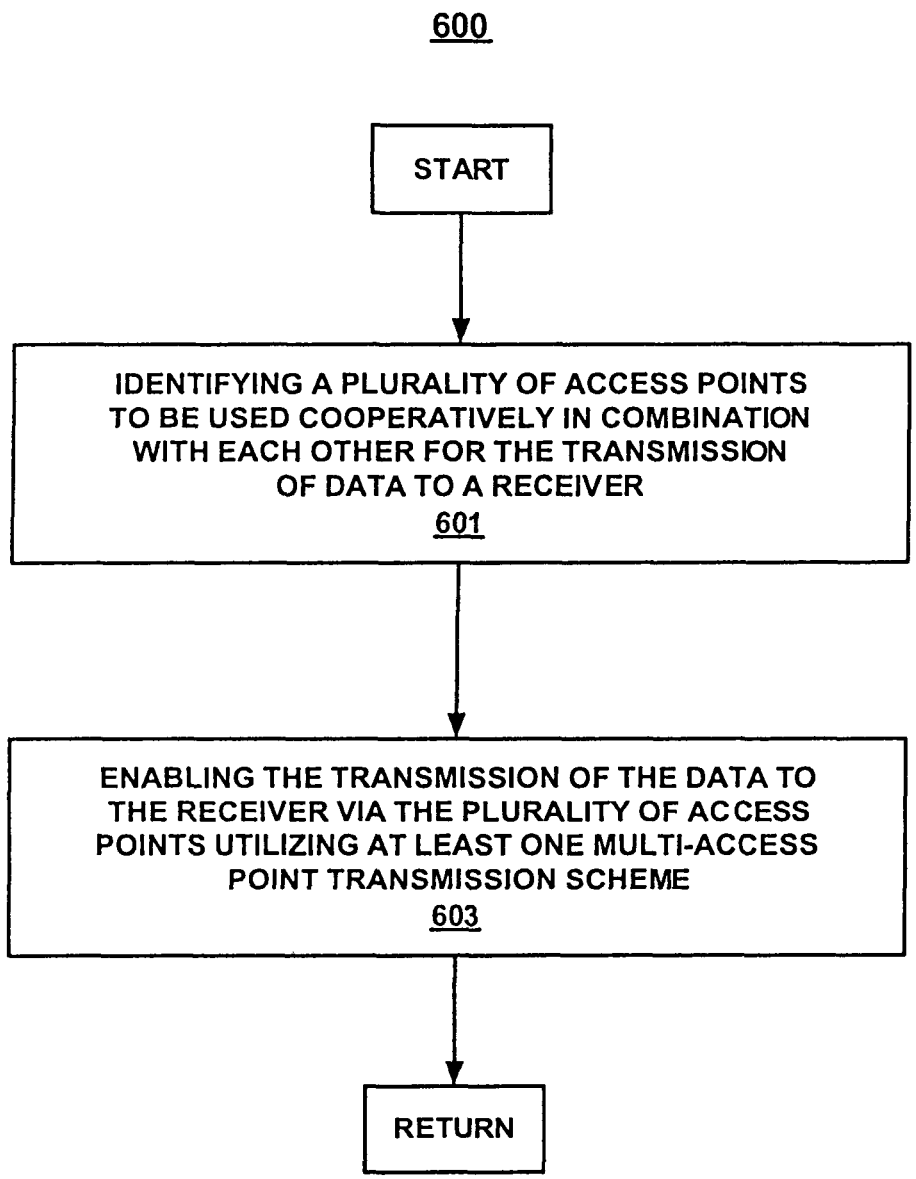
FIG. 6 is a flowchart of a method for multi-access point transmission of data using a plurality of access points according to one embodiment of the present invention.

Split-Stream Multi-Access Point Transmission Scheme in Accordance with Embodiments of the Present Invention FIG. 4A graphically illustrates a split-stream multi-access point transmission scheme according to one embodiment of the present invention. FIG. 4A will described herein with reference to the exemplary data transmission infrastructure shown in FIG. 3 and the flowchart of FIG. 6. Referring now to FIG. 6, at 601 the present embodiment identifies a plurality of access points, (e.g., access point 305 and access point 307 of FIG. 3) located in a distributed infrastructure of access points to be used cooperatively in combination with each other for the transmission of data to a receiver 309. In FIG. 4A, data packets are designated with the reference characters $d_1$-$d_x$. In the present embodiment, the cooperative usage of the plurality of access points is maintained for at least some portion of a data transmission period.

It should be appreciated that although two access points, 305 and 307, are shown in FIG. 4A, the split-stream multi-access point transmission scheme of the present embodiment is well suited to use in a distributed infrastructure of access points that has more than two access points. For example, in one embodiment there may be hundreds of access points in the distributed infrastructure of access points, while in another embodiment there may be dozens of access points. In fact, in the present embodiment, the distributed infrastructure can encompass any number of access points. Consequently, the split-stream multi-access point transmission scheme described with reference to FIG. 4A can be applied among various sized subsets of access points that are located in a distributed infrastructure having any number of access points.

In addition, although the access points 305 and 307 are shown in FIG. 4A as being located at the end (or side) of the transmission infrastructure 303 that is nearest the receiver 309, the access points 305 and 307 can be located at either one or both ends of the transmission infrastructure 303, or at end and intermediate points.

Referring again to FIG. 6, at 603 the present embodiment enables the transmission of data from sender 301 to receiver 309 via the identified plurality of access points (e.g., 305 and 307) using a predetermined multi-access point transmission scheme. In the present embodiment, data is transmitted in a pattern that corresponds to the transmission scheme that is employed, where data transmission is constrained to at least two access points during at least some portion of a data transmission period.

In the embodiment of FIG. 4A, the multi-access point transmission scheme is a split-stream multi-access point transmission scheme. According to one embodiment, in the split-stream multi-access point transmission scheme, data to be transmitted from sender 301 to receiver 309 is allocated such that access points of the identified plurality of access points operate cooperatively and in combination by transmitting different portions of said data in an alternating manner. According to one embodiment, data stream portions can be substantially evenly distributed among access points 305 and 307.

For example, an allocation of data organized in data packets among the access points 305 and 307 can be made by transmitting odd numbered data packets of the data through one access point (e.g. access point 305) and even numbered data packets of the data through the other access point (e.g. access point 307) or vice versa. According to other embodiments, other means of performing the allocation of data packets that can result in a range of substantially uneven allocations of data packets can be employed. More generally, the split-stream multi-access point transmission scheme of the present embodiment is well suited to various allocations of data between the identified plurality of access points. Furthermore, the split-stream multi-access point transmission scheme of the present embodiment is able to utilize any allocation ratio between the identified plurality of access points. That is, the present split-stream multi-access point transmission scheme is able to allocate, for example, 70 percent of the data packets to be transmitted to a first of the identified access points and the remaining 30 percent of the data packets to be transmitted to a second of the identified access points. Similarly, the present split-stream multi-access point transmission scheme is able to allocate, for example, 90 percent of the data packets to be transmitted to a first of the identified access points and the remaining 10 percent of the data packets to be transmitted to a second of the identified access points. More generally, the present split-stream multi-access point transmission scheme is able to allocate any percent of the data packets to be transmitted to a first of the identified access points and the remaining percent of the data packets to be transmitted to a second of the identified access points. Also, when more then two identified access points are used cooperatively and in combination with each other to transmit data, the present split-stream multi-access point transmission scheme is able to allocate any percentage of the data packets to a first of the identified access points and allocate the remaining percent of the data packets evenly or unevenly across the remaining identified access points. The ability to split traffic among multiple access points provides measurement that can subsequently be used for determining which access points receive more traffic.

In the present embodiment, data refers to media or non-media data that can be live or recorded. An item of data can include, but is not limited to, video-based data, audio-based data, image-based data, web page-based data, graphic data, text-based data or some combination thereof. For example, data can include a movie of digital video disk (DVD) quality. Although shown in FIG. 4A as a data stream, a transmission can comprise either streaming or non-streaming data components or both.

Although FIG. 4A shows the portion of the transmission infrastructure 303 nearest the sender 301 as wired (e.g., 100 Mbps, Ethernet), and the portion of the transmission infrastructure 303 nearest the receiver 309 as wireless (802.11b, 1111 Mbps WLAN), the present embodiment is well suited to a variety of wired and/or wireless implementations. In addition wired/wireless communication protocols such as the Internet, Universal Serial Bus (USB), FireWire (IEEE 1394), parallel, small computer system interface (SCSI), infrared (IR) communication, Bluetooth wireless communication, broadband, and the like can be employed. It should be appreciated that the transmission infrastructure 303 can include both wired and/or wireless components or any combination of these components at both end and intermediate points of the transmission infrastructure (e.g., 303 in FIG. 3).

The split-stream multi-access point transmission scheme of FIG. 4A features a non-adaptive use of a multi-access point transmission scheme wherein the allocation of data packets is not dependent on feedback (e.g., measurements). However, measurements can be employed in the split-stream multi-access point transmission scheme approach, for example to assist at step 601 in the initial identification of the access points located in a distributed infrastructure of access points that are to be used. It should be appreciated that the split-stream multi-access point transmission scheme provides significant performance gains over conventional approaches where only a single transmission path is employed.

One advantage of the split-stream multi-access point transmission scheme is that if one access point is temporarily interfered with, the data that is being transmitted via another access point (that is operating cooperatively in combination with the interfered with access point) can continue to be delivered. Moreover, because data packets are spaced further apart, the effect of burst losses is diminished using the split-stream multi-access point transmission scheme.

Figure 4B:
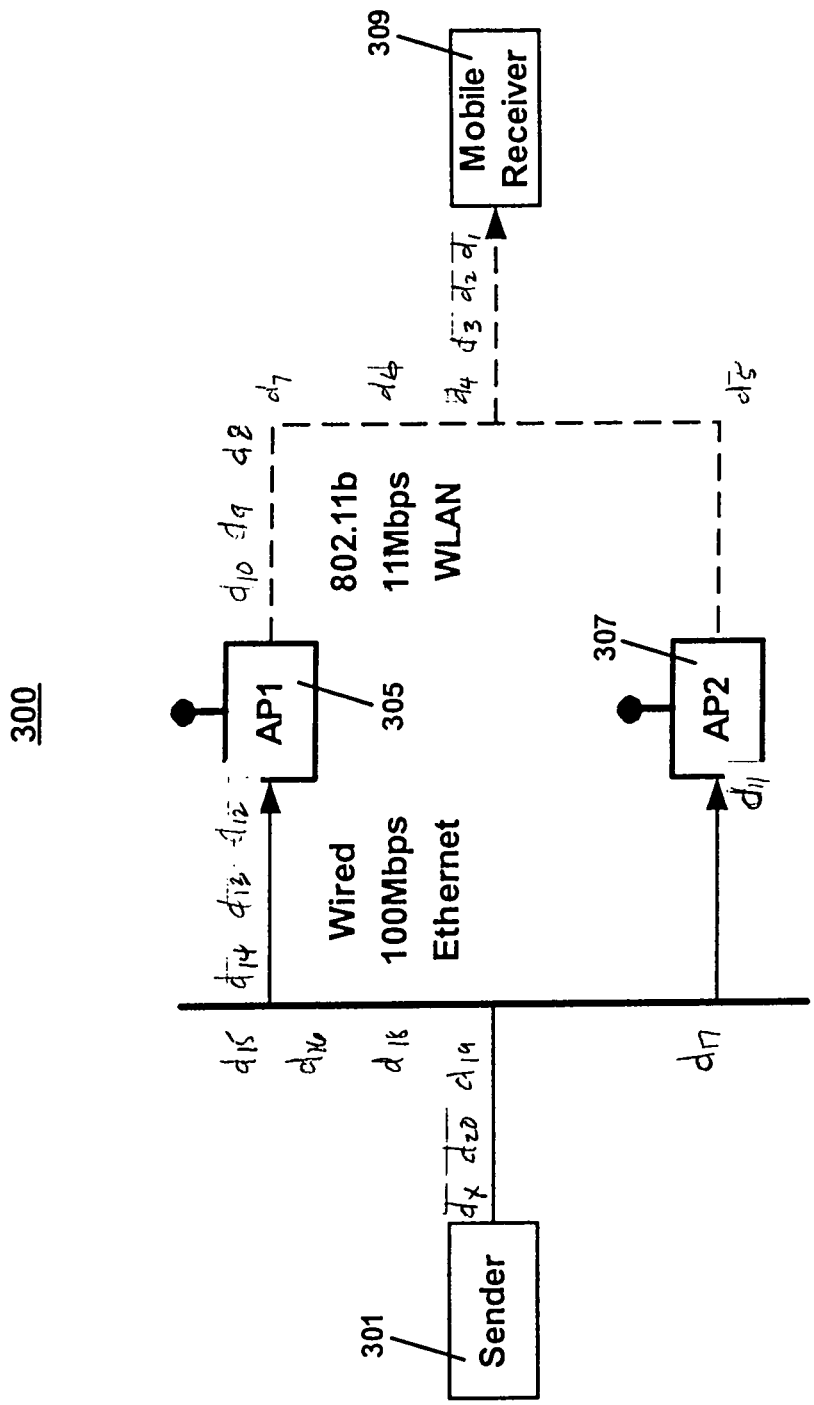
FIG. 4B shows a site selection multi-access point transmission scheme according to one embodiment of the present invention.

Site Selection Multi-Access Point Transmission Scheme in Accordance with Embodiments of the Present Invention FIG. 4B graphically illustrates a site selection multi-access point transmission scheme according to one embodiment of the present invention. FIG. 4B will be described herein with reference to the exemplary data transmission infrastructure shown in FIG. 3 and the flowchart of FIG. 6. Referring now to FIG. 6, at 601 the present embodiment identifies a plurality of access points, (e.g., access point 305 and access point 307 of FIG. 3) located in a distributed infrastructure of access points to be used cooperatively in combination with each other for the transmission of data to a receiver 309. In FIG. 4B, data packets are designated with the reference characters $d_1$-$d_x$. In the present embodiment, the cooperative usage of the plurality of access points is maintained for at least some portion of a data transmission period. Note that site selection in our context does not require all traffic to be transmitted using a preferred access point.

It should be appreciated that although two access points (e.g., access point 305 and access point 307) are shown in FIG. 4B, the site selection multi-access point transmission scheme of the present embodiment is well suited to use in a distributed infrastructure of access points that has more than two access points. For example, in one embodiment there may be hundreds of access points in the distributed infrastructure of access points, while in another embodiment there may be dozens of access points. In fact, in the present embodiment, the distributed infrastructure can encompass any number of access points. Consequently, the site selection multi-access point transmission scheme described with reference to FIG. 4B can be applied among various sized subsets of access points that are located in a distributed infrastructure having any number of access points.

In addition, although the access points 305 and 307 are shown in FIG. 4A as being located at the end (or side) of the transmission infrastructure 303 that is nearest the receiver 309, the access points 305 and 307 can be located at either one or both ends of the transmission infrastructure 303, or at end and intermediate points.

Referring again to FIG. 6, at 603 the present embodiment enables the transmission of data from sender 301 to receiver 309 via the identified plurality of access points (e.g., 305 and 307) is enabled using a predetermined multi-access point transmission scheme. In the present embodiment, data is transmitted in a pattern that corresponds to the transmission scheme that is employed, where data transmission is constrained to at least two access points during at least some portion of a data transmission period.

In the embodiment of FIG. 4A, the multi-access point transmission scheme is a site selection multi-access point transmission scheme. According to one embodiment, in the site selection multi-access point transmission scheme, data to be transmitted from a sender (e.g., 301 in FIG. 3) to a receiver (e.g., 309 in FIG. 3) is allocated such that access points of the identified plurality of access points operate cooperatively and in combination by facilitating the transmission of a majority of the data over a first access point and the transmission of the remainder of the data over a second access point. In the present embodiment, the remainder of the data that is transmitted over the second access point is used to gather information related to the transmission path established via the second access point.

The site selection multi-access point transmission scheme features an identification of a preferred access point (access point with the lowest error rate) and a non-preferred access point according to exemplary embodiments. The majority of the data packets in the data packet stream are transmitted over a path defined through the use of the preferred access point 305. The remainder of the data packets are used to probe the less preferred access point 307 for information related to its performance (to gather statistics). According to exemplary embodiments of the present invention, unlike conventional schemes, data packets continue to be allocated to the paths defined through both preferred access point 305 and non-preferred access point 307.

According to one embodiment, using the site selection multi-access point transmission scheme, some portion of the transmitted data packets is transmitted to the receiver via the preferred access point and some different portion of the transmitted data packets is transmitted to the receiver via the non-preferred access point. According to one embodiment, 95% of the data packets can be transmitted via the preferred access point and 5% can be transmitted via the non-preferred access point. According to other embodiments of the present invention, other data packet allocation ratios can be realized. It should be appreciated that the data packets that are subject to allocation can be prioritized (in terms of importance, length etc.).

According to one embodiment, data packets containing important data can be transmitted to the receiver via the preferred access point and data packets containing less important data (more tolerant data) can be transmitted to the receiver via the non-preferred access point (for information gathering purposes). According to one embodiment, important video packets can be transmitted over the preferred access point (e.g. I and P frames) and less important video frames may be used to probe the non-preferred access point (e.g. B-frames).

Figure 4C:
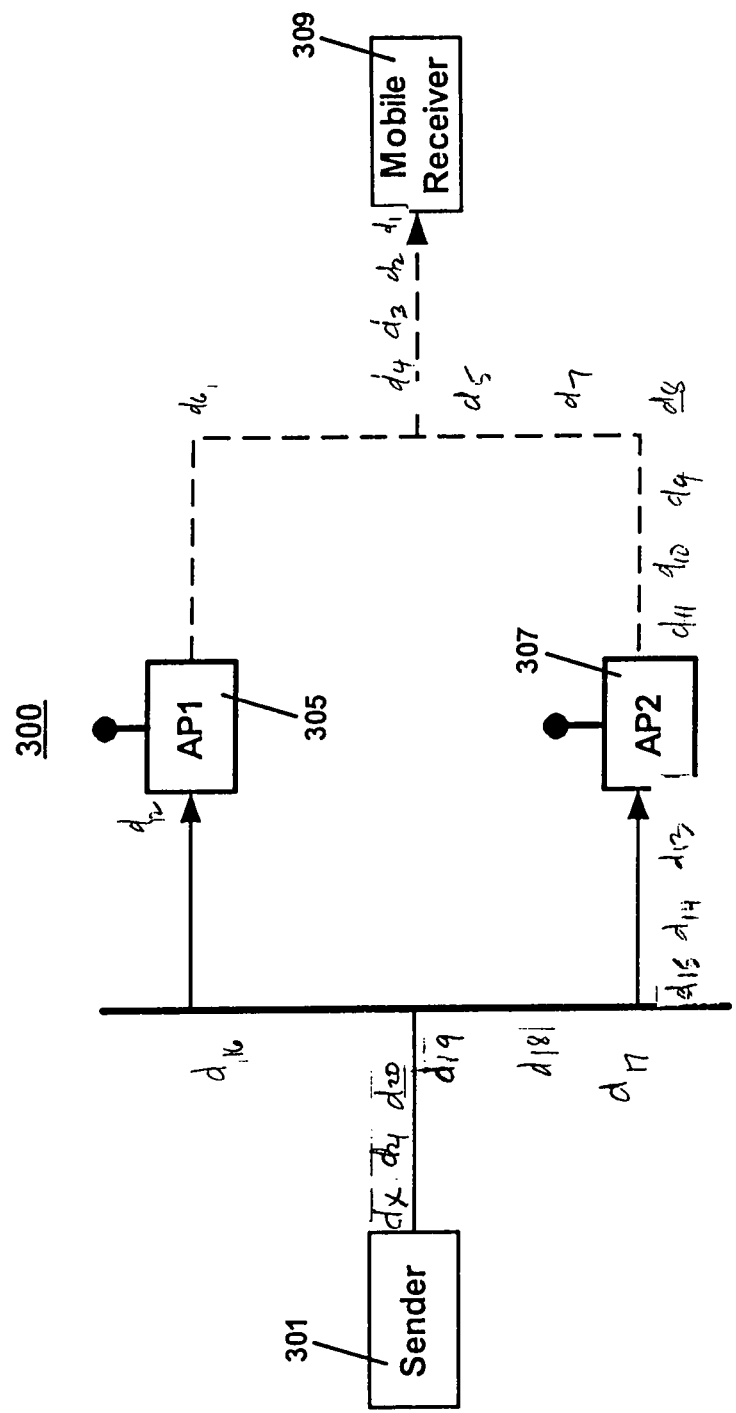
FIG. 4C shows a site selection multi-access point transmission scheme according to one embodiment of the present invention.

It should be appreciated that the site selection multi-access point transmission scheme is adaptive in that the information that is gathered is used in the data packet allocation process (see FIG. 4C). According to one embodiment the split-stream and site selection multi-access point transmission schemes can be combined. For example, split-streams can be transmitted via first and second paths while probing can be performed on a third. According to another embodiment, other combinations of the transmission schemes can be utilized.

Site Selection Multi-Access Point Transmission Scheme in Response to Changes in Channel Condition in Accordance with Embodiments of the Present Invention FIG. 4C illustrates an exemplary response of the site selection multi-access point transmission scheme to changes in channel conditions according to one embodiment of the present invention. The difference between FIG. 4B, and FIG. 4C, is that in FIG. 4C a change in channel condition (e.g., a receiver has moved, cross traffic has moved, or interference has changed) has caused the identification of a different preferred access point. For example, access point 305 was the preferred access point in the configuration depicted in FIG. 4B, and due to some change in conditions, access point 307 becomes the preferred access point in the configuration depicted in FIG. 4C. FIG. 4C shows that the majority of the data packets that are transmitted from the sender 301 to the receiver 309 are transmitted through the newly preferred access point 307.

FIG. 4C shows that based on feedback that results in the identification of a new preferred access point, a system that employs the site selection multi-access point transmission scheme of the present embodiment can adapt and change its allocation of data packets accordingly. Once again, it should be noted that in accordance with exemplary embodiments, although access point 307 is identified in FIG. 4C as being the preferred access point, data packets continue to be allocated to non-preferred access point 305.

Figure 4D:
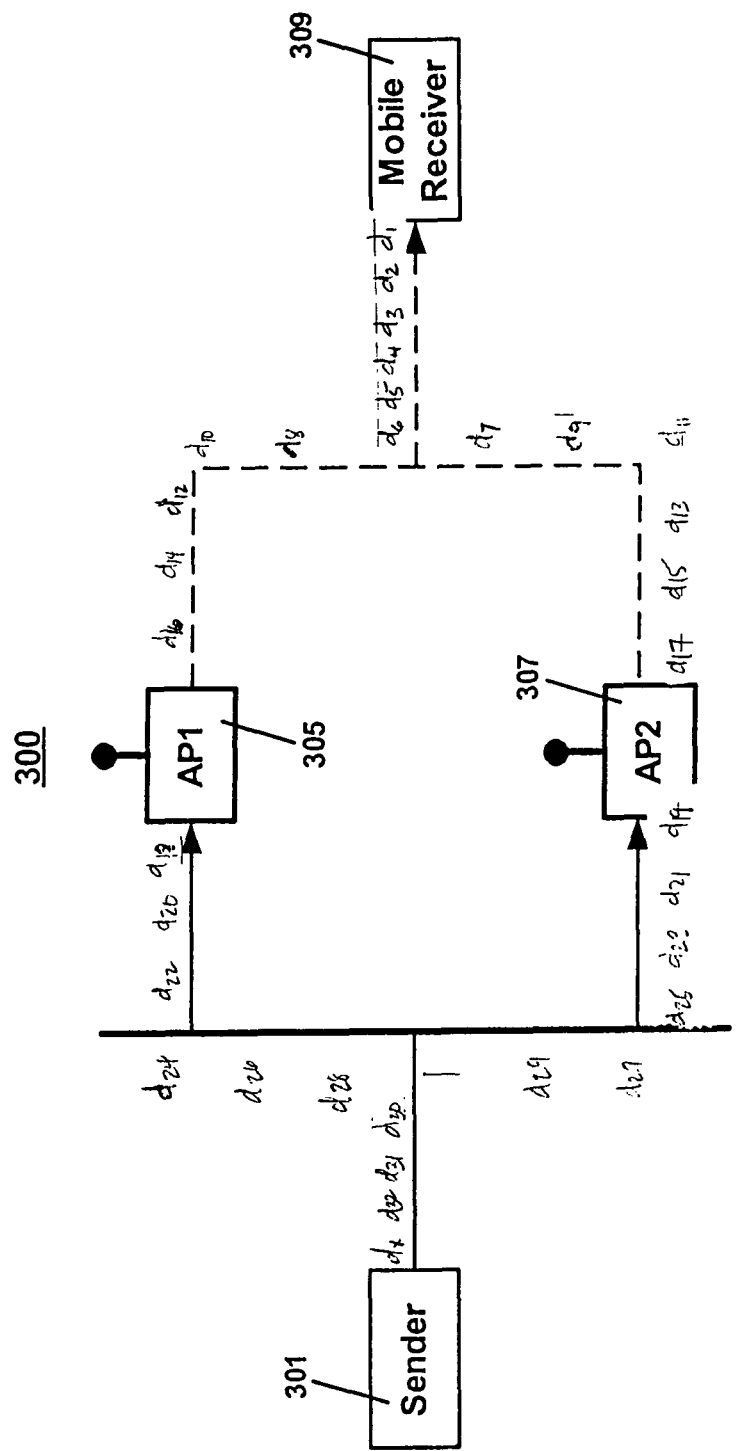
FIG. 4D shows an oracle multi-access point transmission scheme according to one embodiment of the present invention.

Optimal Adaptive Multi-Access Point Transmission Scheme in Accordance with Embodiments of the Present Invention FIG. 4D shows an optimal adaptive multi-access point transmission scheme (herein referred to as the Oracle approach) according to one embodiment of the present invention. Using this scheme, a data packet is declared to be received if it is received from either access point. It should be appreciated that the performance of the optimal adaptive multi-access point transmission scheme is similar to that of repetition coding schemes, where the same data packets are sent from both access points (but at the cost of twice the channel occupancy). The optimal adaptive multi-access point transmission scheme highlights the maximum gain that may be achieved by distributing data packets adaptively across access points. In FIG. 4D as in FIGS. 4A-4C, data packets are designated with the reference characters $d_1$-$d_x$.

According to one embodiment, repetition coding (where similar information is transmitted over both of the identified paths) can be employed in certain cases. Repetition coding can offer improved reliability (e.g., in terms of data packet error rate, etc.). According to an alternate embodiment, the duplicated information that is transmitted may not involve all of the data packets that are transmitted but may involve only certain data packets (e.g., intra-coded frames of MPEG coded data, etc.). It should be appreciated that, in one embodiment, whatever the form of repetition coding employed, the duplicated data packets are transmitted at different points in time by the respective access points (e.g., access point 305 and access point 307) and are received at different points in time by the specified receiver.

Figure 5:
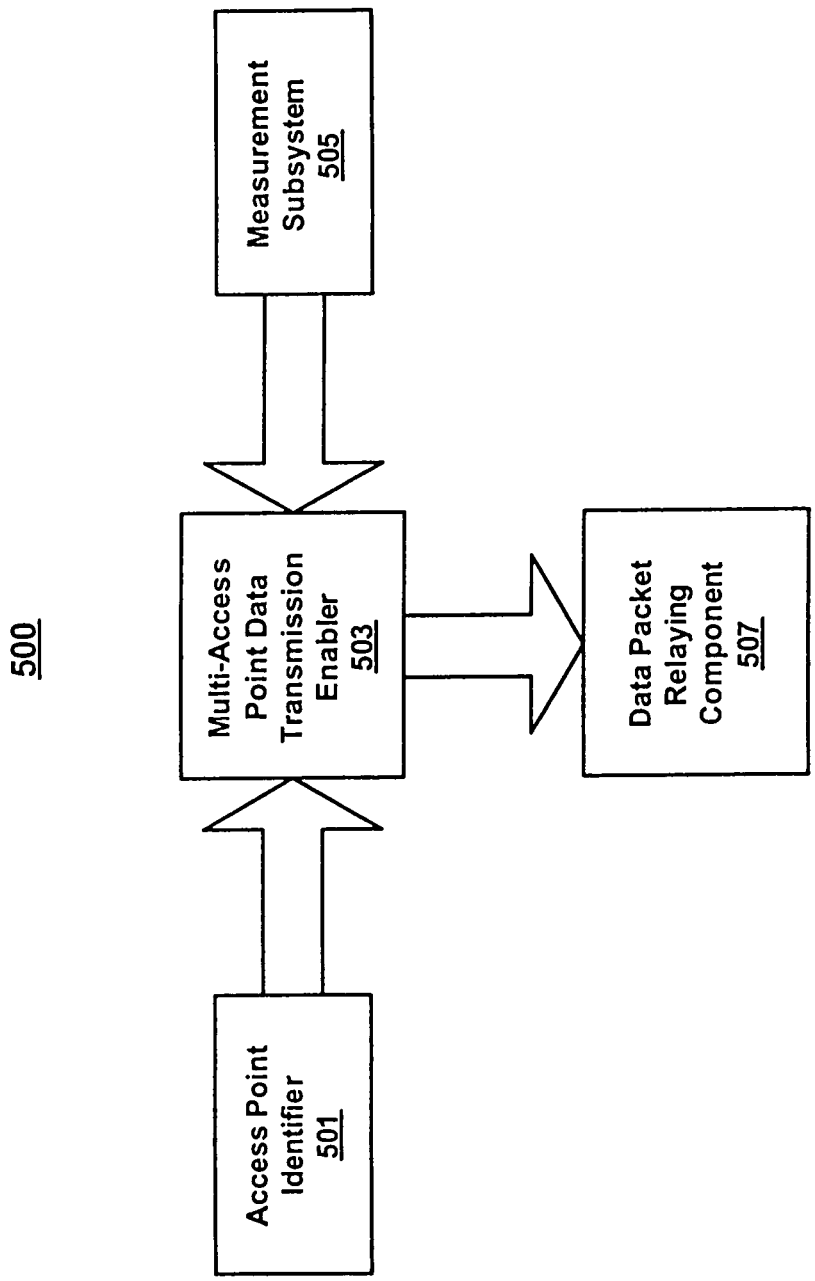
FIG. 5 is a functional block diagram that shows the functional blocks that are a part of the data packet allocation process according to one embodiment of the present invention.

Exemplary Data Packet Allocation System in Acordance with Embodiments of the Present Invention FIG. 5 shows data packet allocation system 500 according to one embodiment of the present invention. System 500 facilitates the identification of a plurality of access points to be used cooperatively in combination with each other in the transmission of data from a sender to a receiver. Moreover, data packet allocation system 500 enables the transmission of the data to the receiver via the plurality of identified access points utilizing at least one multi-access point transmission scheme. System 500 of the present embodiment includes an access point identifier 501, a multi-access point data transmission enabler 503, a measurement sub-system 505, and a data packet relaying component 507.

In accordance with one embodiment of the present invention access point identifier 501 identifies a plurality of access points (e.g., access point 305 and access point 307 in FIG. 3) to be used cooperatively in combination with each other for the transmission of data from a sender to a receiver. After the plurality of access points (e.g., access point 305 and access point 307 of FIG. 3) is identified, an indication of the access points that have been identified is communicated to the multi-access point data transmission enabler 503.

Multi-access point data transmission enabler 503 is communicatively coupled to the access point identifier and enables the transmission of the data to the receiver via the plurality of access points (e.g., 305 and 307 in FIG. 3) by utilizing at least one multi-access point transmission scheme. Multi-access point data transmission enabler 503 determines (for existing conditions) whether the use of a multi-access point transmission scheme is desirable. If the use of a multi-access point transmission scheme is determined to be desirable, multi-access point data transmission enabler 503 selects the transmission scheme to be employed in the transmission of the data packets from sender (e.g., sender 301 in FIG. 3) to the receiver.

In the present embodiment, multi-access point data transmission enabler 503 utilizes a menu of paths (as defined by the transmission schemes used) in its data packet allocation decisions. The data packet allocation decisions are communicated to the network (e.g., data packet relaying component 507) on a packet by packet basis.

In the present embodiment, the multi-access point transmission scheme selected by multi-access point data transmission enabler 503 is based upon factors that include but are not limited to: (1) a predetermined pattern, (2) measurements from a variety of sources, and (3) the content of the data to be transmitted (discussed herein in more detail in the section related to measurements). It should be appreciated that measurements that indicate the quality of links, connections and data flows can be considered as factors. Factors considered that are related to the content of the data packets themselves include data packet type (e.g., I-type frames, P-type frames, etc.), data packet length (e.g., long or short) and data packet importance.

Additional factors that are considered as a part of the data packet allocation decision making process include but are not limited to: (1) the strength of signals that emanate from the access points, (2) the avoidance of congestion (for example using two access points with weaker signals instead of a single stronger one in order to avoid a congested path) (3) quality of service (send data packets deemed important before data packets deemed less important, e.g., I frames via preferred access points). It should be appreciated that the above noted factors allow an identification of an access point that is favorable for data packet transmission even though its identification as such may be counterintuitive. For example, the number data packets received at an access point where signal strength is low can be greater than the number of data packets received at an access point where the signal strength is high.

According to an alternate embodiment a set of access points can be identified solely on the basis of detected signal strength. According to this embodiment a subset of the identified set can then be utilized to practice path diversity using the multi-access point transmission schemes described in the other embodiments.

In an alternate embodiment, an application (not shown) that generates data packets can be configured to make decisions regarding which multi-access point transmission scheme to employ. In such embodiments, the data packet allocation functionality can reside with the application (e.g., VoIP, Video etc.). According to such embodiments, the application can be configured to communicate data packet allocation decisions remotely to intermediate nodes (e.g., data packet relaying component 507) that execute the decisions that are communicated.

Referring again to FIG. 5, measurement subsystem 505 is coupled to the multi-access point data transmission enabler 501. Measurement sub-system 505 provides measurements to the multi-access point data transmission enabler 501 that are used by the multi-access point data transmission enabler 501 to determine which multi-access point transmission scheme to use.

It should be appreciated that the same measurements that are used to determine a multi-access point transmission scheme that is to be employed can be used to determine whether it is desirable to use path diversity at all. The techniques employed to obtain measurements can include but are not limited to probing traffic (using either probing data or actual content data) and detecting beacon intensity. The measurements thus obtained provide information about the transmission paths that are defined through the various access points located in the distributed infrastructure of access points. It should be appreciated that although measurements are not employed in the split stream multi-access point transmission scheme to determine data packet allocation across a plurality of access points (since the allocation of data packets between identified access points is typically static or predetermined according to the split stream multi-access point transmission scheme), the measurements may be used to identify the access points in the distributed infrastructure of access points that can be used.

Data packet relaying component 507 relays data packets to a receiver that are transmitted to it from a sender. According to one embodiment the data packet relaying component 507 can be located at the plurality of access points. According to another embodiment, the data packet relaying component 507 can be located at an intermediate node that is located at a location that is remote from the plurality of access points. In the present embodiment, the data packet relaying component 507 can be implemented by means that include but are not limited to switches, routers, and servers, and other data packet relaying components.

In one embodiment, the access point identifier 501, the multi-access point data transmission enabler 503, the measurement sub-system 505, and the data packet relaying component 507 can all be resident at the same system node. In another embodiment, the access point identifier 501, the multi-access point data transmission enabler 503, the measurement sub-system 505, and the data packet relaying component 507 can all be resident at different system nodes.

Furthermore, the present invention is also well suited to an approach in which the access point identifier 501 and the multi-access point data transmission enabler 503 are resident at the receiver. Also, the present invention is well suited to an approach in which the access point identifier 501 and the multi-access point data transmission enabler 503 are resident at the sender. According to yet another embodiment, the access point identifier 501 and the multi-access point data transmission enabler 503 can be resident at different system nodes. In another embodiment in accordance with the present invention, the access point identifier 501 and the multi-access point data transmission enabler 503 can reside at the plurality of access points (e.g., access point 305 and access point 307 in FIG. 3).

Quantitative Network Measurements Used in Data Packet Allocation Decisions Acccording to Embodiments of the Present Invention According to exemplary embodiments, measurements generated at various layers of function in inter node communication are utilized in the data packet allocation decision making process. According to one embodiment, the layers of inter node communication where such measurements can be generated can include but are not limited to: (1) link, (2) network and (3) application layer.

Link Layer

Link layer processes control such activities as flow control and error checking. In accordance with link layer protocol, clients can transmit either control information or summaries related to received signal strength back over the network to be used in the data packet allocation process, according to exemplary embodiments.

Further, in one embodiment, if the client controls data packet allocations it transmits data packet allocation control information to an access point. If the client does not control data packet allocation, the client transmits summaries of received signal strength that can be employed in data packet allocation decisions. In addition to information related to received signal strength, in one embodiment, the client also transmits information related to data packet error rate (loss rate), burst characteristics (length, pattern and frequency of losses) and delay.

Additionally, in another embodiment in accordance with the present invention, each data packet includes an associated timestamp that is examined to determine delay. The measurements are made at the physical layer by the system itself or by the application. In one such embodiment, the client examines a data packet's timestamp in order to determine the extent of its delay. It should be appreciated that data packets can be subject to either erratic delay (delay jitter) or substantial delay.

Also, in another embodiment of the present invention, some link layer information is obtained from the beacons that are transmitted by access points. This information can be transmitted 10 to 100 times per second. The information that can be obtained from such transmissions does not have to be elicited through probing. However, it should be noted that real traffic can be probed at a high density and in some cases can provide more reliable information.

The transmissions of one access point can be monitored (e.g., "sniffed") by another access point in yet another embodiment of the present invention. This is done to elicit such information as data packet delay, the number of data packets that are transmitted, and received signal strength. For example, if a first access point is transmitting data packets that are of interest to a second access point, data that is related to the data packets of interest can be elicited through such monitoring by the second access point. This data can be used to provide the second access point with estimates that are useful in its own operations. Moreover, this information can be obtained without the necessity of probing.

In accordance with wireless network (e.g., 802.11, etc.) specifications, access points are expected to transmit acknowledgement of data packet receipt to the sender of a data packet immediately after a data packet is received. Receipt of such acknowledgement provides verification that in the forward direction a data packet was transmitted. If acknowledgement of a data packet's receipt is not received it indicates that the data packet has been lost or was not transmitted. In any event it provides an indication that problems may exist with the access point responsible for transmitting the acknowledgement.

Consequently, although most of the measurements that are described herein are discussed in the context of client measurements, with regard to receipt of data packets, the sender is also positioned to know whether data packets have been successfully delivered. Knowing whether or not transmitted data packets have been successfully delivered provides an indication of the existing level of congestion at the queue of an access point.

Network Layer

It should be appreciated that although retransmission based delay measurements can be ascertained from link layer processes, network layer timestamps can provide more meaningful measures of delay. This is because the aggregate measures of delay that can be elicited from timestamps can be particularly useful in determining channel conditions.

According to exemplary embodiments of the present invention, techniques that may be employed to ascertain delay measurements can include but are not limited to pinging, probing and the monitoring of data packet flow though access points (the flow of data packets per second through an access point can be either read locally or ascertained remotely by using device query). Also, a simple network management protocol (SNMP) measurement can be made.

In one embodiment, a network layer measurement harness that generates probe data packets can be employed to determine delay. Moreover, a variety of techniques for using such harnesses are available and can be employed to determine delay according to exemplary embodiments.

Further, in another embodiment in accordance with the present invention, network layer measurements that involve ascertaining the degree of congestion that exists at the queue of an access point are employed to determine delay. Congestion is determined by the use of a counter readout or by conventional traffic probing techniques. According to one embodiment, delays that occur when data packets are dropped from congested queue ends are distinguished from delays caused from data packet losses that occur from transmission through the wireless medium.

According to one embodiment, a counter readout provides an indication of how deep a queue has been over a period of time. It should be appreciated that measurements that provide an indication that an access point has a queue that is filled are useful since it is more likely that data packets will be dropped from the queues at such access points.

In another embodiment of the present invention, network layer measurements such as data packet length are used in data packet allocation decisions. It should be appreciated that short data packets are more likely than are long data packets to survive transmission in noisy channels. However, in congested channels where there is only one slot available per data packet, any extra space can be wasted if short data packets are used. Consequently, long data packets can be used for transmission through congested channels and short data packets can be used for transmission through noisy channels.

Application Layer

Application layer measurements are used to provide an indication of the importance of data packets. Moreover, content can be tagged explicitly as a means of indicating the importance of data packets. It should be appreciated that if an intermediate node has knowledge of an application (e.g., VoIP, Video etc.) its knowledge of the importance of the application's data packets (B frames are understood to be less important than I frames, etc.) can facilitate the allocation of the data packets according to importance.

According to one embodiment of the present invention, a client can provide useful information accessible at the application layer. It should be appreciated that the information that can be provided by a client is particularly useful since the client is the ultimate arbiter of performance. The client's estimation of performance can be based on its content reconstructing experience. In one such embodiment, an aggregated measure of the client's experience is used in data packet allocation decisions. Metrics that can be a part of such estimations can include but are not limited to client error, concealment, and interpolation. By generating such an aggregated measure of its experience, the client itself can provide an indication of its degree of satisfaction (e.g., report) that is accessible at the application layer.

The measurements discussed herein are only presented for clarity and brevity and do not constitute an exhaustive listing of the measurements that can be employed to practice embodiments of the present invention. It should be appreciated that measurements of types, and from sources, other than those mentioned can be used to support the processes described herein.

Advantages of embodiments of the present invention include lower data packet loss rates on average, fewer bursts lengths, and better application level performance.

Exemplary Network Characteristics According to One Embodiment of the Present Invention According to one embodiment, (1) video compression can be based on H.264/MPEG-4 AVC (previously known as H.26L) which provides high compression efficiency and good resilience to losses, (2) low-latency best-effort transport mechanisms can be used, and (3) potential path diversity from multiple access points can be used, where multiple paths are simultaneously employed or where multiple paths (site selection) are switched between as a function of channel characteristics.

The MPEG-4 and H.263 Version 2 video compression standards, as well as the emerging ITU H.264/ISO MPEG-4 Part 10 AVC standard (previously known as H.26L), are compression standards that can be employed. It should be appreciated that H.264 is specifically designed to be resilient to data packet losses, and supports low-latency applications.

Further, it should be appreciated that end to-end latency can be affected by end-to-end (host-to-host) behavior and link behavior. The end-to-end behavior includes flow control and potential retransmits (which delay subsequent data packets). To minimize the end-to-end latency, the video is compressed at an approximately constant bit rate (CBR) and is packetized so that it is resilient to data packet loss. The resilience to data packet loss, coupled with the fact that most losses occur on the wireless link (where fast link-layer retransmits can be used), obviates the need for end-to-end retransmits. According to one embodiment, the compressed video can be transmitted using RTP/UDP/IP.

It should be appreciated that wireless LAN (e.g., 802.11b) operate in the unlicensed 2.4 GHz ISM band, and are often afflicted by a variety of impairments. The quality of a wireless link generally can vary with time, and depends on radio propagation in the local environment, mobility, cross traffic, and interference from microwave ovens, Bluetooth transmitters and other sources. These effects contribute to data packet losses in the wireless link. While low signal quality can corrupt data transmission, contention from both exposed and hidden nodes can cause data packet collisions.

It should be appreciated that when link losses occur, wireless networks may invoke link-layer retransmissions to recover lost data packets. Each retransmission can incur a delay of 2-22 ms (the delay grows as the randomized backoff increases with each successive failure). According to one embodiment, if existing wireless network drivers are modified, a maximum retransmission limit can be set for each data packet to tradeoff latency and loss in a fine-grain manner.

Another source of latency arises from the carrier sense mechanism used in some wireless networks (e.g., 802.11). Before sending a data packet, the transmitter detects whether the channel is busy (either from an ongoing transmission or a non 802.11 interferer). If the channel is busy the sender (e.g., 301) blocks until the channel is free, causing a non-deterministic delay.

According to one embodiment of the present invention, the above noted problems can be overcome by using multiple access points (e.g., 305 and 307) as is described herein. Even though a client (e.g., 309) conventionally talks with a single access point (AP) at any point in time, there are often a number of nearby access points in the infrastructure (e.g., 303). Each of these access points is often strategically placed at a different location, and therefore offers a different relationship to the client (e.g., 309) with respect to distance, obstructions, multipath, signal strength, contention, available bandwidth, neighboring interferers, and potential hidden nodes. According to exemplary embodiments the distributed infrastructure of access points surrounding a client can be used to provide sender (e.g., 301) or receiver (e.g., 309) diversity and thereby improve the client's communication from the wireless to the wired space.

Experimental Setup and Results According to One Embodiment of the Present Invention To evaluate the performance of using multiple access points for video communication with low-latency constraints, a number of experiments were conducted to collect appropriate data packet traces. As shown in FIG. 3, a single source was used to send a uniformly spaced sequence of about 1500 byte data packets to each of two 11 Mb/s 802.11b wireless access points, (AP1) 305 and (AP2) 307 (see FIG. 3), over a 100 Mb/s wired Ethernet network. The data packet spacing was 1/30th of a second, to emulate a video frame rate of 30 frames/s. Each data packet contained a departure timestamp and a sequence number. Whenever a data packet arrived, the wireless access points immediately forwarded it to the same mobile receiver over the same channel using 802.11b ad-hoc mode. The access points were physically separated by about 25 meters of lab space area that was occupied by open cubicles and had been tested to be well within radio range of each other. The access points were configured with RTS/CTS and data packet fragmentation disabled and a factory default transmission retry limit of 16. To minimize queuing delay, the transmission queue length was set to 6 data packets.

The present experimental results were obtained by comparing the performance of low-latency video over single versus multiple access points. Ideally, the results should be representative of the average performance experienced by a mobile wireless receiver such as a PDA, laptop, etc. However, the results were highly location dependent; moving the receiver by only a few inches caused a 10-20 dBm change in signal strength and over 50% change in data packet loss rate. This problem was addressed by collecting a 15 minute data packet trace from a mobile receiver that was pushed on a cart at walking speed. The mobile receiver remained within 15 meters of at least one AP (and at most 40 meters from the other) at all times. Thus, the data packet trace represented a continuous sampling of streaming performance at different locations in range of the access points.

Another challenge is the uncontrolled interference in the environment. Ideally, performance statistics for streaming over a single access point would be collected in one trial, the experiment is then repeated using two access points in a separate trial, then the two measurements would be compared. However, spurious interference-generated by the daily activities of the building occupants-changes with every trial. Hence, the data collected and shown in FIGS. 7, 8, 9, 10A and 10B use the same 15-minute data packet trace to generate five sub-sampled traces representing different transmission schemes. Because the sub-sampled traces are generated from the same data packet trace, they all experience the same interference pattern, which then allows for making fair comparisons.

The five sub-sampled traces were generated as follows (the original 15-min data packet trace contained constant data packet rate streams from both access points). First, a sub-sampled trace AP1 was generated by selecting only the data packets streamed from access point (AP1) 305 in the 15-minute data packet trace. Thus, trace AP1 represents a scenario with 30 data packets per second sent from (AP1) 305 and 30 data packets per second cross traffic sent from (AP2) 307. Likewise, trace AP2 represents a scenario where the video is streamed from (AP2) 307 while the cross traffic is sent from (AP1) 305. The third sub-sampled trace, Balanced, represents a scenario where two access points streamed a 30 data packets per second video, each access point simultaneously transmitting exactly one half the stream at 15 data packets per second. This is a "dumb" path diversity approach since it used (AP1) 305 and (AP2) 307 equally, regardless of their respective link conditions. This trace was generated by selecting every other data packet from each of the two streams from our original 15-min data packet trace.

The fourth trace, Site Selection, represents a site selection approach that adaptively selected the access point with the lowest error rate. In detail, the preferred access point (AP) supplied 95% of the data packets, while the other access point (AP) supplied the remaining 5% (for probing). The selection is recomputed at each time using the reception statistics from the 300 previous data packets. The final trace, Oracle, was included to provide a bound on the performance of any site selection algorithm. This trace is generated by declaring a data packet to be received if it is received from either access point. It should be appreciated that the performance of Oracle is equal to that of repetition coding, in which the same data packets were sent from both APs (but at the cost of twice the channel occupancy).

Figure 2:
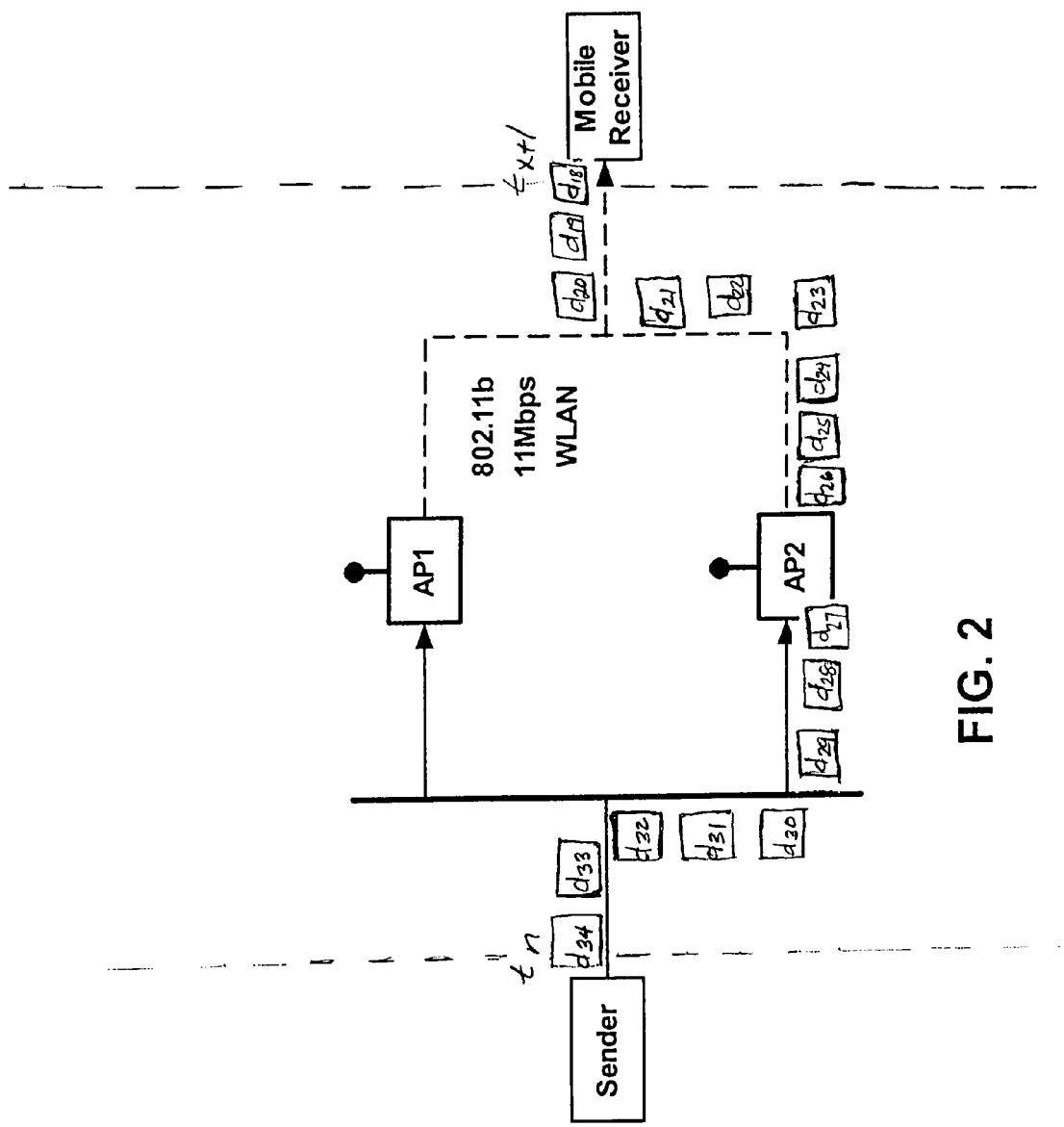
FIG. 2 illustrates an aspect of the operation of a conventional handoff scheme.
Figure 7:
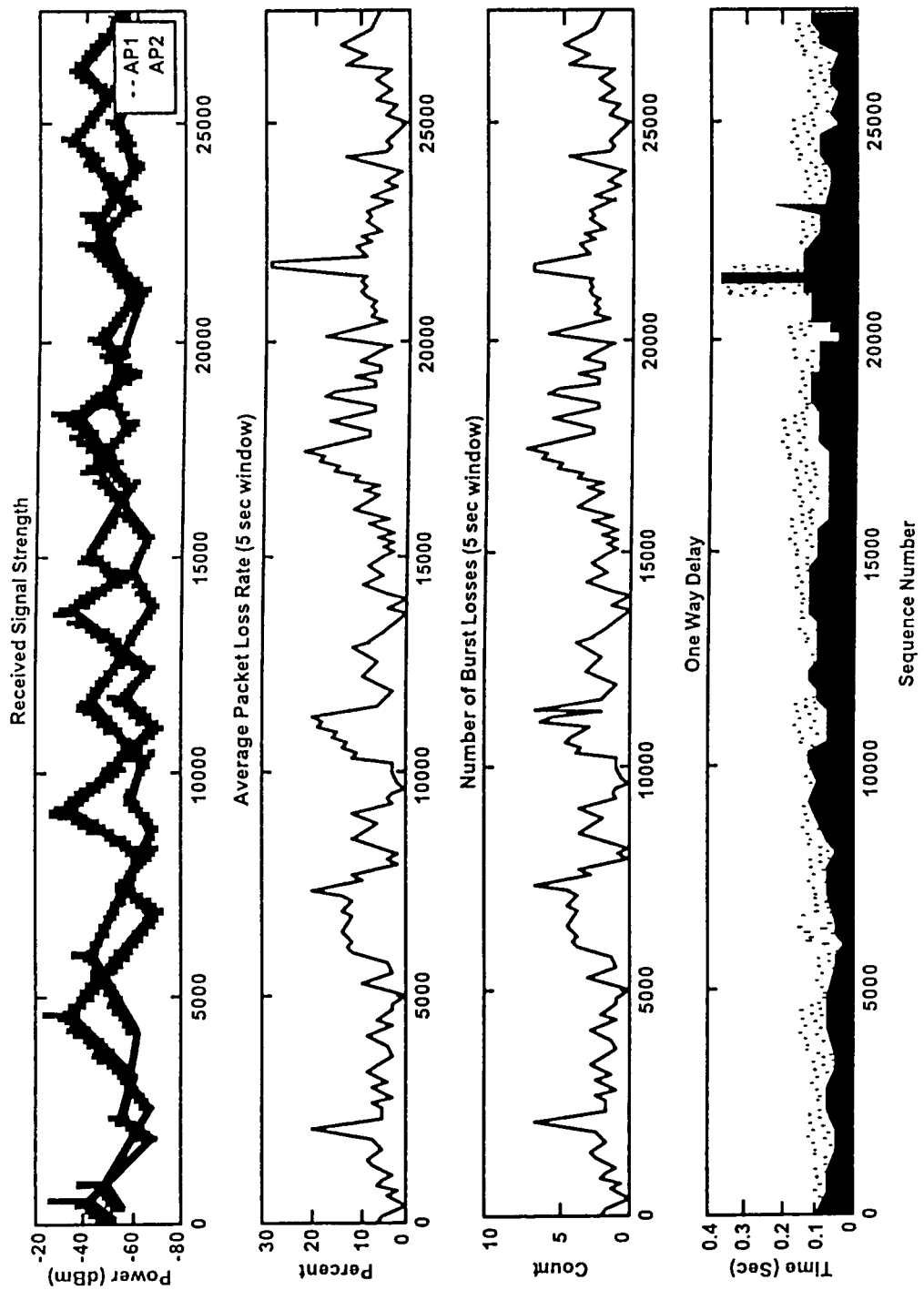
FIG. 7 shows the performance of access points AP1 and AP2 according to one embodiment of the present invention.

FIG. 7 shows the performance of access points (AP1) 305 and (AP2) 307. The top plot shows the evolution of the received data packet signal strength (RSS). There are times where the signal quality of access point (AP1) 305 is much better than access point (AP2) 307 and vice versa. The next two plots graph the average data packet loss rate ($PLR_I$) and the number of loss events ($L_i^{Burst}$) of burst length≥2 for traces AP1 and AP2. Each statistic is computed over an interval i of 150 data packets (5 secs). As is shown in FIG. 2 there is a high correlation among RSS, $PLR_I$, and $L_i^{Burst}$. The high $PLR_I$ values are counterintuitive, as the maximum retry limit is 16 and the streams are sent at a rate of 360 kb/s, which is well below the saturation rate of approximately 6 Mb/s in 802.11b. In the experiment, data packets are rarely dropped at the access points' queues; thus, almost all the losses are caused by wireless transmission. The bottom plot shows the normalized one way delay for each data packet in the trace (normalized by subtracting the minimum delay over all data packets). Due to spurious interference and the large transmission retry limit, there often exist delays much greater than 150 ms, an unacceptable value in many low latency communication applications.

Figure 10A:
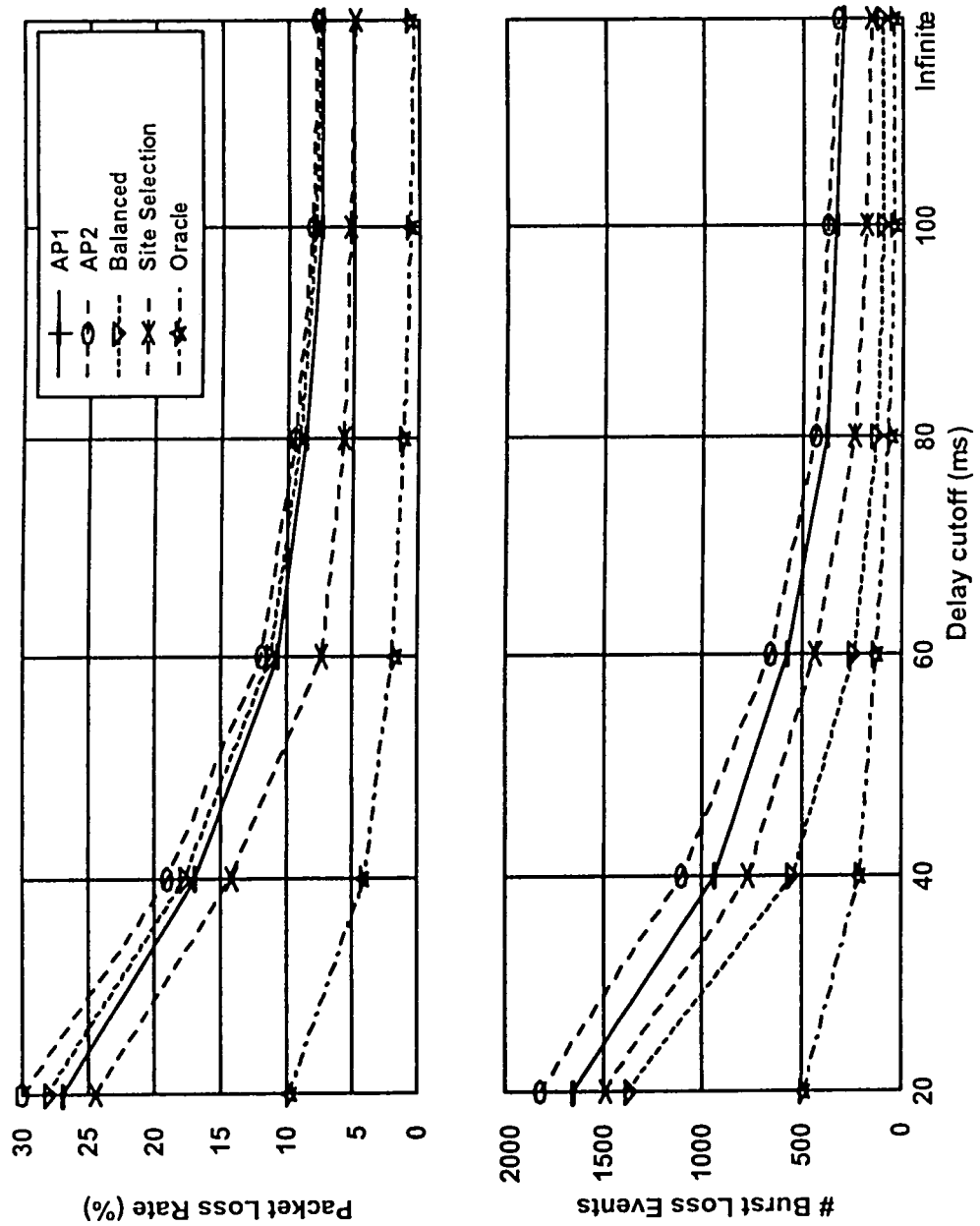
FIG. 10A shows results in graphical format for various multi-access point transmission schemes according to one embodiment of the present invention.
Figure 10B:
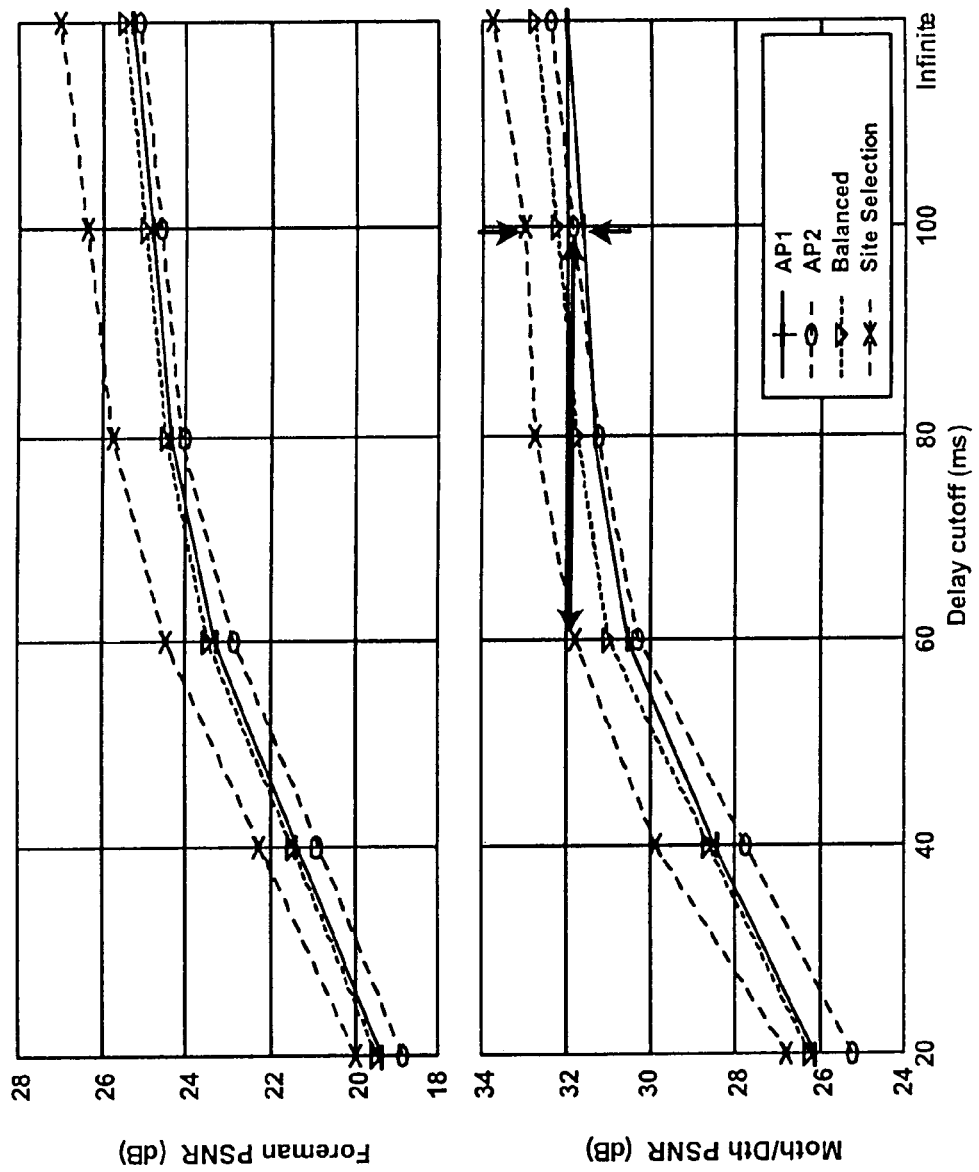
FIG. 10B shows results in graphical format for various multi-access point transmission schemes according to one embodiment of the present invention.

Results for the traces Balanced, Site Selection, and Oracle are displayed in FIG. 8 (Table 1), FIG. 9 (Table 2), FIG. 10A and FIG. 10B. The single access point results (trace AP1 and trace AP2) are included for comparison. To model the sensitivity of applications to delay, a delay threshold $D_{thr}$ is introduced. For purposes of the experiment if a data packet experienced a one-way delay above $D_{thr}$, it was assumed lost.

Referring to FIG. 8 (Table 1) and the plots of FIG. 10A, it is shown that (AP1) 305 and (AP2) 307 have similar performance. As expected, the data packet loss rate (PLR) of Balanced was the approximate average of trace AP1 and trace AP2, but the number of burst events was much lower. In Site Selection, a significant reduction in PLR as compared to Balanced was realized. While the number of burst events falls between Balanced and traceAP1/traceAP2. The Oracle trace performed the best of all. It highlights the maximum gain that may be achieved by distributing data packets adaptively across access points.

The application-layer performance in terms of reconstructed video quality is next examined. Video sequences are compressed using JM 2.0 of the emerging H.264/MPEG-4 AVC video compression standard and are appropriately framed into data packets which are sent as RTP/UDP/IP. Four standard video test sequences in QCIF format are used: Foreman, Claire, Mother-Daughter, and Salesman. Each has 300 frames at 30 frames/s, and is coded with a constant quantization level. The average Peak Signal-to-Noise Ratio (PSNR) and the bit rate for each sequence are given in the column headings of Table 2 of FIG. 9. PSNR is a measure of signal fidelity, with high PSNR corresponding to high fidelity. The first frame of each sequence is coded as an I-frame, and all subsequent frames are coded as P-frames. To improve error-resilience, a slice in every $4^{th}$ frame is intra updated, corresponding to an intra update every N=4×9=36 frames. Both the data packet framing and the intra update are as recommended in JM 2.0. Each P-frame fits within a 1500-byte payload, i.e., within a single transmitted data packet, while the first I-frame requires a number of data packets. The transmission of each video sequence is simulated by assuming the data packet loss patterns of the five traces: trace AP1, trace AP2, Balanced, Site Selection, and Oracle. Each 10 sec video sequence is replicated 90 times to span the 15 minute data packet trace. This also corresponds to an I-frame every 10 seconds.

The measured distortion for various video sequences, transmission schemes, and delay thresholds are given in Table 2 of FIG. 9 and the plots of FIG. 10B. The average PSNR over the entire 15 minute test is displayed. In addition, Table 2 of FIG. 9 gives the number of times the average PSNR over a 10-second window (period between I-frames) drops below 30.0 dB (28.0 dB for Foreman). This latter metric provides an indication of the frequency of objectionable events during the trace.

Comparing Tables 1 (FIG. 8) and 2 (FIG. 9), the primary cause of improvement in average PSNR is reduced PLR. The Site Selection trace improves the average PSNR relative to the conventional approach of using only a single access point (either AP1 or AP2) by 1.6-3.0 dB. The Balanced trace in addition indicates that reducing the occurrence of burst loss events-even at the same PLR—has a secondary but still significant beneficial effect, ranging from 0.1 to 1.7 dB (which suggests that burst losses produce greater total distortion in the reconstructed video than an equal number of isolated losses).

Based on the results in Tables 1 (FIG. 8) and 2 (FIG. 9), at the same $D_{thr}$, the Site Selection trace provides a reduction in PLR by 2-4.5% and an improvement in PSNR, of 1.6-3.0 dB as compared to the conventional case where a single AP is used. Alternatively, as shown by the arrows in FIGS. 10A and 10B. for the same PLR and $PSNR_{AVE}$, 7, Site Selection allows a reduction in the required delay threshold by about one third, e.g. from 100 ms to 60 ms, thereby improving interactivity.

According to exemplary embodiments, the use of path diversity from multiple access points can provide significant benefits as compared to the conventional case where only a single access point is used. This was shown in the foregoing discussion for both a non adaptive scheme that alternates access points for each data packet, and for an adaptive scheme that uses past error statistics to select an access point. The adaptive scheme provides significant improvements in PLR and $PSNR_{Ave}$ for the same delay threshold, or a sizable reduction in the required delay threshold to achieve the same PLR and $PSNR_{Ave}$. According to exemplary embodiments, an upper limit on performance has been established using a diversity scheme based on an all-knowing Oracle.

In summary, embodiments of the present invention provide methods and systems for multi-access point transmission of data using a plurality of access points are disclosed. Methods include identifying a plurality of access points to be used cooperatively in combination with each other for the transmission of data to a receiver. The transmission of the data to the receiver via the plurality of access points is enabled utilizing at least one multi-access point transmission scheme.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for delivering data, in a wireless system comprising a distributed infrastructure of access points, said method comprising:
    identifying a plurality of access points to be used cooperatively in combination with each other for the transmission of said data to a receiver, wherein said cooperative usage of said plurality of access points is maintained for at least some portion of a data transmission period;
    enabling the transmission of said data to said receiver via said plurality of access points, wherein said data is transmitted in a pattern that uses at least two access points during at least some portion of said data transmission period, wherein data packets of said data comprise timestamps and wherein said pattern is selected from a group of predetermined patterns; and
    determining, during the transmission, performance of at least one of said access points being used for the transmission to enable transmitting at least a portion of said data through a different access point while the transmission is in progress, wherein said performance is based at least on examination of said timestamps.

2. The method of claim 1 wherein said pattern is a split-balanced transmission pattern.

3. The method of claim 1 wherein said pattern is a site selection transmission pattern.

4. The method of claim 1 wherein said pattern is a combination of a split-balanced transmission pattern and a site selection transmission pattern.

5. The method of claim 1 wherein respective access points of said plurality of access points operate cooperatively and in combination by transmitting different portions of said data in an alternating manner.

6. The method of claim 1 wherein respective access points of said plurality of access points operate cooperatively and in combination by facilitating the transmission of a majority of said data over a first access point and the transmission of a remainder of said data over a second access point.

7. The method of claim 6 wherein said remainder of said data is used to gather information related to said second access point.

8. The method of claim 1 wherein said pattern is selected based upon information from the group consisting of various predetermined patterns, measurements from a variety of sources, and the content of said data to be transmitted.

9. A method for delivering data utilizing a multi-access point transmission scheme, said method comprising:
    identifying a plurality of access points to be used cooperatively in combination with each other for the transmission of said data to a receiver wherein said cooperative usage of said plurality of access points is maintained for at least some portion of a data transmission period, wherein data packets of said data comprise timestamps;
    delivering a first portion of said data to said receiver via a first access point;
    delivering a second portion of said data to said receiver via a second access point, wherein said first portion of said data and said second portion of said data are delivered to said receiver utilizing at least one predetermined multi-access point transmission scheme and wherein said first and said second access points operate cooperatively and in combination by transmitting different portions of said data in an alternating manner; and
    determining, during the delivering of said first and second portions, performance of at least one of said access points being used for the delivering of said first and second portions to enable delivering at least a portion of said data through a different access point while the first and second portions are being delivered, wherein said performance is based at least on examination of said timestamps.

10. The method of claim 9 wherein said multi-access point transmission scheme comprises a split-balanced transmission scheme wherein data portions are evenly balanced across said plurality of access points.

11. The method of claim 10 wherein said multi-access point transmission scheme comprises a site selection multi-access point transmission scheme wherein said first and said second access points operate cooperatively and in combination and wherein a transmission of a majority of said data is made over said first access point and the transmission of a remainder of said data is made over said second access point.

12. The method of claim 11 wherein said remainder of said data is used to gather information related to said second access point.

13. The method of claim 11 wherein said split-balanced multi-access point transmission scheme and said site selection multi-access point transmission scheme are used in conjunction.

14. A system for data delivery in a wireless system comprising a distributed infrastructure of access points, said system comprising:
    an access point identifier that identifies a plurality of access points to be used cooperatively in combination with each other for the transmission of said data from a sender to a receiver wherein said cooperative usage of said plurality of access points is maintained for at least some portion of a data transmission period; and
    a multi-access point data transmission enabler communicatively coupled to said access point identifier, said multi-access point data transmission enabler enabling the transmission of said data to said receiver via said plurality of access points by utilizing at least one multi-access point transmission scheme that uses at least two access points during at least some portion of said data transmission period, wherein data packets of said data comprise timestamps, and wherein said multi-access point data transmission enabler determines, during the transmission, performance of at least one of said access points being used for the transmission to enable transmitting at least a portion of said data through a different access point while the transmission is in progress, wherein said performance is based at least on examination of said timestamps and wherein said transmission scheme is selected from a group of predetermined patterns.

15. The system of claim 14 further comprising:
a measurement subsystem coupled to said multi-access point data transmission enabler, said measurement subsystem providing measurements that are used by said multi-access point data transmission enabler to determine data packet allocations across said plurality of access points.

16. The system of claim 15 further comprising:
a data packet relaying component coupled to said multi-access point data transmission enabler, said data packet relaying component for relaying data packets to said receiver that are transmitted to said data packet relaying component from said sender.

17. The system of claim 16 wherein said access point identifier, said multi-access point data transmission enabler, said measurement sub-system, and said data packet relaying component are all resident at the same system node.

18. The system of claim 16 wherein said access point identifier, said multi-access point data transmission enabler, said measurement sub-system, and said data packet relaying component are not all resident at the same system nodes.

19. The system of claim 16 wherein said access point identifier and said multi-access point data transmission enabler are resident at said receiver.

20. The system of claim 16 wherein said access point identifier and said multi-access point data transmission enabler are resident at said sender.

21. The system of claim 16 wherein said access point identifier and said multi-access point data transmission enabler are resident at least one intermediate system node.

22. The system of claim 16 wherein said access point identifier and said multi-access point data transmission enabler are located at least one of said plurality of access points.

23. A non-transitory computer useable medium having computer useable code embodied therein for causing a computer to perform operations comprising:
identifying a plurality of access points to be used cooperatively in combination with each other for the transmission of said data to a receiver, wherein said cooperative usage of said plurality of access points is maintained for at least some portion of a data transmission period;
enabling the transmission of said data to said receiver via said plurality of access points utilizing at least one predetermined multi-access point transmission scheme that uses at least two access points during at least some portion of said data transmission period, wherein packets of said data comprise timestamps and wherein respective access points of said plurality of access points operate cooperatively and in combination by transmitting different portions of said data in an alternating manner; and
determining, during the transmission, performance of at least one of said access points being used for the transmission to enable transmitting at least a portion of said data through a different access point while the transmission is in progress, wherein said performance is based at least on examination of said timestamps.

24. The non-transitory computer useable medium of claim 23 wherein said enabling said transmission of said data comprises utilizing at least one multi-access point transmission scheme that comprises a split-balanced multi-access point transmission scheme.

25. The non-transitory computer useable medium of claim 23 wherein said enabling said transmission of said data comprises utilizing at least one multi-access point transmission scheme that comprises a site selection multi-access point transmission scheme.

26. The non-transitory computer useable medium of claim 23 wherein said enabling said transmission of said data comprises utilizing a split-balanced transmission scheme and a site selection multi-access point transmission scheme that are used in conjunction.

27. The non-transitory computer useable medium of claim 23 wherein respective access points of said plurality of access points operate cooperatively and in combination by facilitating the transmission of a majority of said data over a first access point and the transmission of a remainder of said data over a second access point.

28. The non-transitory computer useable medium of claim 27 wherein said remainder of said data is used to gather information related to said second access point.

29. The non-transitory computer useable medium of claim 23 wherein the use of said multi-access point transmission scheme is based upon information that is selected from the group consisting of a predetermined pattern, measurements from a variety of sources, and the content of said data to be transmitted.

30. A method for delivering data, in a wireless system comprising a distributed infrastructure of access points, said method comprising:
identifying a plurality of access points to be used cooperatively in combination with each other for the transmission of said data to a receiver;
enabling the transmission of said data to said receiver via said plurality of access points utilizing at least one multi-access point transmission scheme, wherein data packets of said data comprise timestamps and wherein respective access points of said plurality of access points operate cooperatively and in combination by transmitting different portions of said data in an alternating manner; and
determining, during the transmission, performance of at least one of said access points being used for the transmission to enable transmitting at least a portion of said data through a different access point while the transmission is in progress, wherein said performance is based at least on examination of said timestamps.

31. The method of claim 30 wherein said enabling said transmission of said data comprises utilizing at least one multi-access point transmission scheme that comprises a split-balanced transmission scheme.

32. The method of claim 30 wherein said enabling said transmission of said data comprises utilizing at least one multi-access point transmission scheme that comprises a site selection multi-access point transmission scheme.

33. The method of claim 30 wherein said enabling said transmission of said data comprises utilizing a split-balanced transmission scheme and a site selection multi-access point transmission scheme that are used in conjunction.

34. The method of claim 30 wherein respective access points of said plurality of access points operate cooperatively and in combination by facilitating the transmission of a majority of said data over a first access point and the transmission of a remainder of said data over a second access point.

35. The method of claim 34 wherein said remainder of said data is used to gather information related to said second access point.

36. The method of claim 30 wherein said multi-access point transmission scheme is selected based upon information from the group consisting of a predetermined pattern, measurements from a variety of sources, and the content of said data to be transmitted.

* * * * *